Oct. 31, 1961  J. T. SILER  3,006,443
METHOD AND APPARATUS FOR ATTACHING JUXTAPOSED MEMBERS
Filed Dec. 20, 1954  2 Sheets-Sheet 1
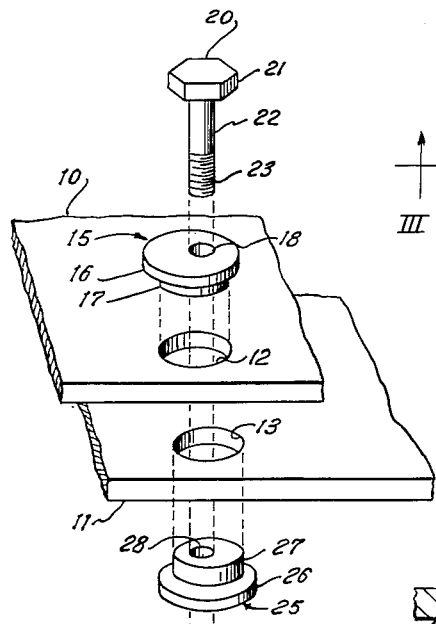
Fig. I
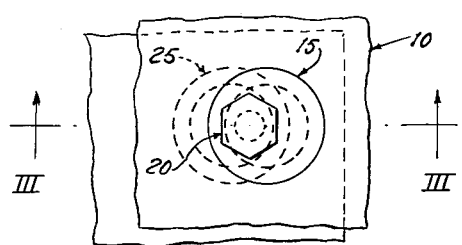
Fig. II
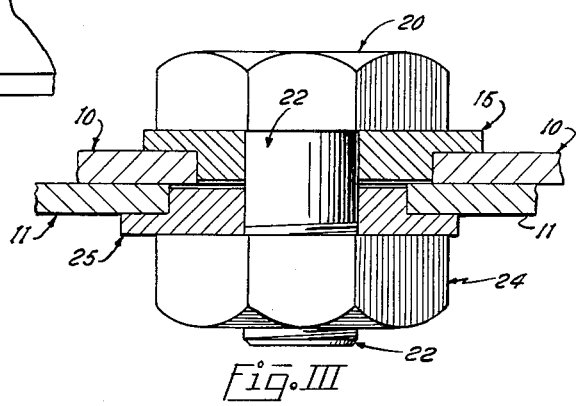
Fig. III
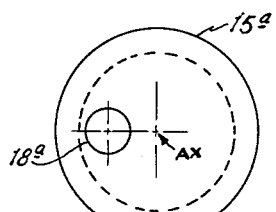
Fig. IV
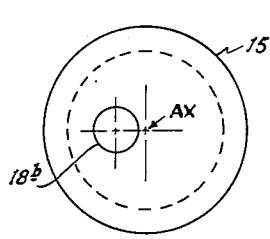
Fig. V
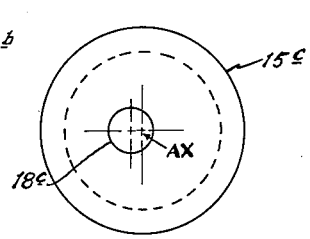
Fig. VI
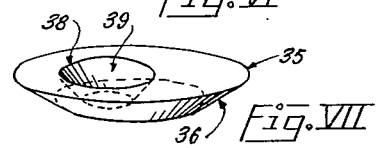
Fig. VII
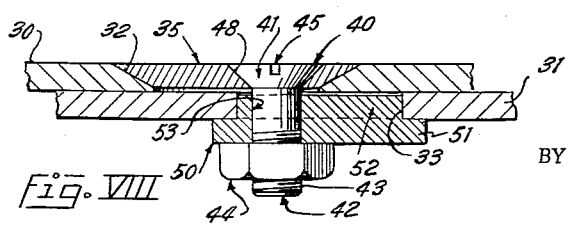
Fig. VIII
INVENTOR
Joseph T. Siler
BY Austin Wier
and Howard E. Moore
ATTORNEYS Oct. 31, 1961  J. T. SILER  3,006,443
METHOD AND APPARATUS FOR ATTACHING JUXTAPOSED MEMBERS
Filed Dec. 20, 1954  2 Sheets-Sheet 2
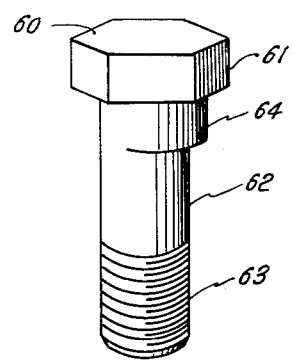
Fig. IX
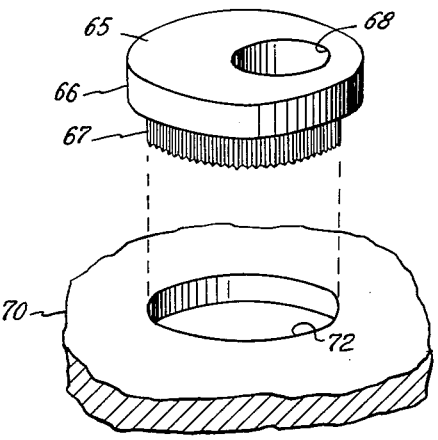
Fig. X
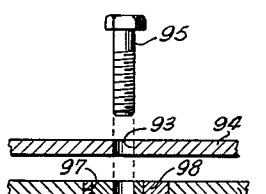
Fig. XIII
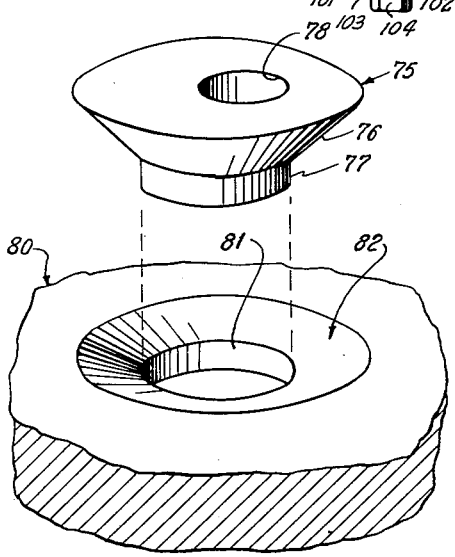
Fig. XI
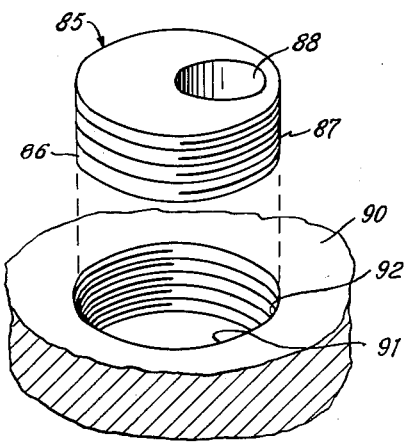
Fig. XII
INVENTOR
Joseph T. Siler
BY
ATTORNEYS

United States Patent Office 3,006,443
Patented Oct. 31, 1961

3,006,443
METHOD AND APPARATUS FOR ATTACHING
JUXTAPOSED MEMBERS
Joseph T. Siler, Dallas, Tex.
Filed Dec. 20, 1954, Ser. No. 476,469
6 Claims. (Cl. 189—36)

Primarily, this invention is concerned with fastening and attaching method and apparatus designed to adjust and accommodate misalignment in holes, slots, openings or passageways in a plurality of juxtaposed members (such as plates, sheets, structural members, castings and the like) which it is desired to have securely held together, or in fixed relation, by bolts, screws, pins or rivets and the like.

In quantity production, involved in the fabrication and assembly of most manufactured articles having a considerable number of parts, it is highly desirable that parts be standardized and made interchangeable. To the extent that this object is realized, the cost of assembling the product, measured in terms of time and labor, is reduced. In usual practice a considerable number of costly tools, templates, jigs and fixtures are required to be most accurately made and accurately used, especially in the making, drilling or punching of numbers of holes or apertures through and in members which are to be joined and fastened together.

Despite the use of such complementary tools designed to produce holes which will be aligned to receive bolts and the like for fastening a plurality of members together in the finished product, considerable deviation from the true and exact standard desired is usually found in the placement of such holes or apertures. This results in their misalignment which becomes apparent when attempt is made to fasten such members together.

Parts having such deviation from the desired and proper spacing and arranging of the holes, such as will preclude the receiving of bolts, rivets and the like, passing through two or more such holes, simply have to be discarded as waste or scrap material. Such represents a loss of the labor in the making and fabrication of the parts, as well as loss of the material itself.

Frequently, the mechanic working with supposedly exact and interchangeable parts finds some members deviating so far from the desired standard that they cannot be bolted or riveted or otherwise properly fixed together. Thereupon, he frequently resorts to an undesirable expedient which will forever thereafter preclude the replacement and integration into the device (as when undergoing repairs) of a truly standardized part or parts.

In such undesirable practice, the mechanic proceeds to drill new holes by hand, or ream and enlarge the misaligned holes, so that they will receive bolts or other fastening elements.

Such expediency and ill considered practice will produce a weakened structure because it has been provided with irregular or enlarged holes greatly exceeding the limits of tolerance allowed by the designing engineers and/or failing to meet the requirements of standards in strength and stability.

A primary object of this invention is the provision of a pair of auxiliary fastening members, called adapters, to be used in connection with elongated fastening elements, such as bolts, rivets, screws, or other elements, for fastening members of a structure together, without having to alter the openings designed initially to receive such bolts, etc., notwithstanding such openings may not be properly aligned.

A further object of this invention is the provision, in such auxiliary fastening adapters of holes or passages therethrough which are not centered therein, but which, on the other hand, are eccentrically placed, so that by the rotating of opposed adapters the holes therethrough may be made to coincide, notwithstanding that the bodies of such adapters may not be in alignment, but actually overlapping to some considerable extent.

A further object of this invention is the provision in an auxiliary fastening adapter of a reinforcing extension, such as a depending body or a raised or elevated projection from the head part of the device.

Eccentrically placed holes or passages through such adapters also pass through the reinforcing body part, which is usually of greater thickness, whether it be elevated above or depending from the main head part of the device.

One such reinforcing adapted is designed to be fitted into each of a pair of holes or openings initially provided to receive a fastening element (such as a bolt), even through such pair of openings may not be in alignment.

The provision of the reinforcing body greatly strengthens the final assembly, stabilizes the structure, and prevents slippage between the primary members joined and fastened together through the use of adapters.

A further object of this invention is the provision of an auxiliary fastening adapter having a reinforcing part therein, and an eccentrically disposed passage therethrough, and a tapered or beveled section adapted to fit into a tapered or beveled opening in one of a plurality of members to be joined together.

An adapter so constructed, together with the head of the screw or bolt passing therethrough, may be installed flush with the surface of a plate or member being fastened in place, thus offering no resistance to air flowing thereover. Such structure is particularly desirable in fastening together parts of the shell or outer structural members of aircraft.

Even when the flush type design of adapter is employed on the outer surface of aircraft, it is possible and sometimes desirable to employ the extended or non-flush type of adapter within the interior of the structure, where air friction is not a problem.

Some examples of suitable structures embodying acceptable forms of the invention are shown in the accompanying drawings, in which:

FIG. I shows an exploded perspective view of typical elements (secured and securing) in which two sheets or plates are to be fastened together and reinforced, with bolt holes finally aligned, notwithstanding the original openings intended for fastening the plates together are misaligned.

FIG. II shows a plan view of fragmentary parts of two overlapping plates in which the original openings are not in alignment, but in which the bolt holes or passages have been properly aligned and reinforced with the use of this invention.

FIG. III shows a partially sectionalized elevational view of the structure shown in FIG. II, taken along line III—III thereof.

FIG. IV is a plan view of a typical aligning and reinforcing adapter in which the bolt passage is located near the extreme edge of the reinforcing section.

FIG. V is a plan view of a typical aligning and reinforcing adapter in which the bolt passage is located approximately midway between the periphery of the reinforcing section and the center or axis thereof.

FIG. VI is a plan view of a typical aligning and reinforcing adapter in which the bolt passage is located near the center of the reinforcing section.

FIG. VII is a perspective view of a modified form of a single reinforcing and aligning adapter, the outer face of which is beveled or tapered and in which the bolt passage also is tapered, such modified structure permitting the flush mounting of the adapter.

FIG. VIII is a partially sectionalized elevational view of a typical installation employing a flush type adapter in the upper plate and a projecting type of adapter in the lower plate, and showing the final alignment of bolt passages, whereby both plates may be firmly secured together.

FIG. IX shows a perspective view of a special bolt, being an offset type of elongated fastening element, which requires the additional use of only one adapter (not shown in this view).

FIG. X shows a perspective view of a modified form of eccentric adapter, in which the peripheral wall of the body section thereof is provided with serrations, allowing the adapter to be rotated into proper position immediately above the opening which is to receive it, but preventing any further rotation when such body is forced into said opening.

FIG. XI shows a perspective view of another modified form of eccentric adapter, in which the head section thereof is beveled and in which the wall of the smaller and depending body thereof is made substantially vertical, thus providing added reinforcement to the joint in which such adapter is used.

FIG. XII shows a perspective view of another modified form of eccentric adapter which constitutes an insert to be introduced in its entirety in the opening arranged to receive it, there being external threads on the adapter and companion internal threads in said opening.

FIG. XIII is a cross-sectional elevational view of another modified form of eccentric adapter assembly wherein the adapters are disposed on only one side of attached juxtaposed members.

This invention should be considered against the background of several serious problems in manufacturing that have not heretofore been solved.

In many operations in several industries, notably in the automotive industry and the airplane industry, and in precision manufacture generally, the diameter of the companion holes intended to receive fastening elements is severely limited by a narrow range in the allowed tolerance.

Closely limited tolerance has been considered necessary for several reasons. Oversized holes (to receive the fastening elements) have heretofore been found to result in weakening the product. Oversized holes allow slippage between the members joined. Oversized holes lessen the amount of the bearing surface available to the head and the nut of a bolt. Oversized holes increase the danger of shearing the fastening elements.

This invention permits the making of oversized companion holes, and at the same time prevents slippage, prevents weakness, prevents the loss of desired bearing surfaces, and prevents shearing of the fastening elements.

In fact, this invention produces a stronger joint. It produces a reinforced joint, with increased bearing surface. And it insures alignment of companion passages which are arranged to receive a bolt or other fastening element.

Employment of the method and the devices of this invention results in safe, rapid, exact and precise assembly in manufacture, and permits uninterrupted and continuous economical assembly work, without any alteration of parts by hand.

Such satisfactory results come about through the use of a pair of special fastening adapters in each pair of misaligned companion holes or openings.

Each adapter is rotatable within the opening into which it is introduced.

Each such adapter has a more or less centrally arranged and thickened reinforcing section, extending from the main part or head section of the adapter.

Each such adapter is provided with an eccentrically located hole or passage which is so disposed as to pass through the reinforcing section at a point other than the center of the adapter.

Holes thus provided through the adapters may be made to meet all of the severest requirements in respect to tolerances in the work being fabricated.

Each adapter introduced into a misaligned hole is rotatable within such hole. Therefore, a pair of such adapters may be so rotated, each in its respective hole, until the smaller holes, which pass through the adapters themselves, are brought into perfect alignment.

Thereupon, it becomes easy to introduce the fastening element (bolt, pin, screw, rivet or the like) into and through the adapters.

The members to be joined may then be properly held thereby. Such members may be drawn up tight and secure, and made fast under conditions which preclude any slippage and which will allow the maximum bearing surface for the fastening element itself, and which will also minimize the danger of shearing such element.

This invention is capable of several embodiments, as will be evident by selected forms thereof which are set out in the drawings. In these drawings the more important parts, elements, members and structures are indicated by separate numerals.

A typical structure illustrating the method and apparatus of this invention is shown in FIG. I, wherein an upper juxtaposed member 10 has been arranged for attachment in fixed relation to a lower juxtaposed member 11. In order to provide for such attachment a relatively large opening 12 is provided through member 10; and a substantially similar opening 13 is provided through member 11.

It is not necessary that openings 12 and 13 be in alignment. In fact, it is because of the frequent occurrence of misalignment of openings in holes through which fastening elements are intended to be passed that the method and apparatus here set forth has come into being. Misalignment of the openings 12 and 13 is indicated in FIG. I.

However, such misalignment is accommodated by the use of special adapters, of which upper adapter 15 and lower adapter 25 are typical and related companions.

Adapter 15 is provided with enlarged head 16, reduced reinforcing body 17 extending from such head, and a passage 18 extending longitudinally through the adapter and arranged eccentrically with respect to the longitudinal axis of such adapter 15.

The inverted lower adapter 25 is provided with enlarged head 26, reduced reinforcing body 27 and eccentrically arranged passage 28.

The placement of passages through the adapters, such as passage 18 and 28 is a matter to be determined in contemplation of the character of manufacturing or fabricating work being carried on, and especially the extent of misalignment likely to be encountered between openings 12 and 13 (or their equivalents) when members 10 and 11 (or their equivalents) are positioned for attachment in fixed relation.

For instance, degrees of offset from the center line or longitudinal axis, indicated as at Ax, in FIGS. IV, V and VI, are shown by the locations of the modified passages 18a and 18b and 18c, in the modified adapters 15a, 15b and 15c, respectively. Of course, many and varied are the possible locations of such passages with respect to the axis of the adapter. Those shown in the drawings are but a few of many possible locations to be selected by the manufacturer in contemplation of the character of work in which adapters are to be incorporated.

Considering FIG. I, it will be noted that, whereas the openings 12 and 13 are not in line, the passages 18 and 28 are in line. The proper alignment of passages 18 and 28 is accomplished by rotating one or the other or both of the eccentric adapters, 15 and 25, until these passages are truly and properly lined up, to receive an elongated fastening element, of which the element 20 is typical.

Such element 20 is provided with enlarged bolt head 21, extended shank 22 and threads 23, together with threaded nut 24.

As shown in this drawing, the elongated fastening element 20 is a flat headed bolt, but many and various are the types of bolts which may be employed satisfactorily as fastening elements between the eccentric adapters. Other elongated fastening elements may be used, as desired, and as may be considered more suitable for the work being done. They may take the form of screws, pins, rods, rivets, brads and the like.

FIG. I shows an exploded view of the parts and members immediately above discussed, which are employed in making up or joining together a desired structural arrangement of certain juxtaposed members having misaligned openings therethrough.

FIG. II makes more clear the positions of the various parts and members after joinder has been completed, as seen from above.

FIG. III, which is a partially sectionalized elevational view of the assemblage of FIG. I after being brought together, as indicated in FIG. II, clearly shows the final positioning and securing of the parts and elements of a typical joint made with the method and apparatus here disclosed.

Frequently, there is no objection to having the ends of the elongated fastening element, of which element 20 is typical, extend above the surface of the finished work. Likewise, in many cases it is entirely permissible to have a part, at least, of the offset adapters extend above the juxtaposed members which are joined through their use.

However, in certain types of fabrication and manufacturing it is desired that a smooth or flush type joint be made. This is especially true where friction is a consideration, whether the friction be occasioned by the movement of gases, liquids or solids.

The friction of flowing fluids is materially reduced by the elimination of offsets. And such is an object in many industries, especially in the aircraft and automotive fields.

Lessening of friction is also sought with respect to boats and vessels and instruments which are designed to pass through, in, or under water.

A flush type joint, employing essential principles of the method and apparatus here disclosed is indicated in FIGS. VII and VIII of the drawings.

An upper juxtaposed member 30 is arranged for attachment in fixed relation to lower juxtaposed member 31 in a typical flush type construction. It is to be noted that the opening 32 in member 30 is so arranged as to permit flush mounting of the modified adapter 35, which is shown in FIG. VIII as a circular segment of a cone, having a beveled outer wall 36 arranged for complementary fitting to the inclined wall of special opening 32.

Of course, the lower member 31 could be provided with an opening like that shown as at 32 and with a modified adapter 35, if such were found desirable. This would produce a flush joint on the lower side of the assembly also.

However, an enlarged opening of substantially vertical character, such as that shown as at 33, may be provided through member 31 to receive the reduced reinforcing body 52 of lower adapter 50, which is provided with enlarged head 51 and eccentric longitudinal passage 53 which goes entirely through adapter 50.

A modified form 40 of an elongated fastening element may be provided with tapered head 41 to fit into the tapered passage 48 of special adapter 35. Such arrangement will allow the uppermost part of head 41 to lie flush with the exposed face of modified adapter 35.

In FIG. VII will be seen a perspective view of eccentric adapter 35, wherein conic passage 38 is shown with inclined wall 39, against which wall the tapered head 41 comes to rest when the joint is made up by tightening up nut 44. Such nut is provided with internal threads to mate with threads 43 arranged on elongated shank 42 of fastening element 40.

To hold fastening element 40 against rotation, while nut 44 is being made up, there should be provided some countersunk recess capable of receiving a wrench, or a transverse slot 45 may be arranged in such head to receive a screwdriver.

The various mechanical forms in which this invention is here disclosed in the drawings indicate the steps and practice of the method. It is to be observed that such method is independent of any particular form of device for fastening members through non-aligned holes or openings.

The method is practiced when two juxtaposed members are arranged for connection in fixed relation, notwithstanding there may be an opening in each such member so positioned that such openings are not in line, but only roughly or approximately opposed to one another.

Usually, such openings are enlarged beyond that which would ordinarily be employed if such pair of openings could always be mated in exact line.

However, a further step in the practice of my method requires the placing in each such opening of an adapter provided with a body section and an eccentrically located passage extending longitudinally therethrough.

Then, one or the other or both of such opposed adapters will be rotated within or at the entrance of its opening until the passages in each of the opposing adapters are in registry.

When this situation has been brought about, then an elongated fastening shaft is secured through the pair of passages thus aligned by movement or rotation of the eccentric adapters.

The method of this invention may be practiced by still other modified forms of fastening elements, and of eccentric adapters, and of members joined.

For instance, a special and modified form of elongated fastening element is shown as at 60, in FIG. IX. It is provided with a head 61 and a shank 62 extending from the head. A portion of the shank is enlarged to provide an offset section 64, which may be arranged immediately next to head 61 or somewhere intermediate the ends of the shank.

The offset 64 is eccentrically arranged with respect to the longitudinal axis of shank 62.

A nut (not shown), which may be like nut 24, can be used in connection with threads 63 to make up a joint, in which elongated fastening element 60 and its eccentric reinforcing section 64 may be made in one piece, as shown in FIG. IX.

A further modification is shown in the special eccentric adapter 65 (of FIG. X), having enlarged head 66, with a reinforcing body extending therebelow, such body being provided with a serrated wall 67. An eccentric passage 68 extends longitudinally through special adapter 65, to receive a fastening element. Such passage is arranged eccentrically with respect to the longitudinal axis of the adapter.

A fragmentary segment 70 of some member which it is desired be attached in fixed relation to some other member (not shown) is provided with an opening 72 therethrough, to receive the serrated reinforcing body 67 of adapter 65.

The relation between the diameters of opening 72 and serrated body 67 may be such that when the body is forced into the opening, the serrations will prevent rotation of the adapter 65 in such opening. It will be understood that the adapter 65 should be rotated to proper position before the body 67 is forced into the opening 72.

Of course, any other form of adapter shown in the drawings may be used in connection with adapter 65, such other form of adapter being provided for another juxtaposed member which may be attached to or held in fixed relation with member 70.

A further form of modified eccentric flush type adapter is shown as at 75, which may be provided with beveled head 76 and a reinforcing body 77 and a passage 78 eccentrically arranged through the adapter. Such is indicated in FIG. XI, wherein a fragmentary section 80 of a member arranged for attachment to another member (not shown) is provided with opening 81, adapted to receive body 77 and further adapted, through the provision of tapered upper part 82 of opening 81, to receive the beveled head 76 of adapter 75, so as to make up a flush joint.

A headless form of flush type adapter is shown as at 85, in FIG. XII. This special adapter is provided with a substantially vertical body 86; and on this body threads 87 are provided so that they may cooperate with threads 92 arranged within opening 91 in fragmentary section 90 of a member to be attached in fixed relation to some other member (not shown).

It may be desirable to provide means to prevent rotation of adapter 85 after being threaded into opening 91, such as a key interposed in keyways provided between the adapter 85 and the opening.

Another type of adapter for attaching juxtaposed members is shown in FIG. XIII, wherein a hole 93 is provided in the segment 94 of a member to be attached. The hole is of substantially the same diameter as attaching bolt 95. The other member 96 to be attached to member 94 has a passage 97 therethrough in which may be inserted the body 98 of an adapter 99. Adapter 99 has an eccentric passage 100 therethrough in which may be inserted the body 101 of an adapter 102. Adapter 102 has an eccentric passage 103 therethrough arranged to receive the bolt 95. The adapters 99 and 102 may be rotated with respect to each other and with respect to the hole 93 until the passage 103 is in alignment with hole 93, so that bolt 95 may be passed through hole 93 and passage 103 and the nut 104 may be threaded onto bolt 95 and the juxtaposed members 94 and 96 may be brought together and firmly secured. Thus, the adapters are disposed on only one side of the attached juxtaposed members.

The practice of my method and the use of the mechanical devices of my invention result in much needed improvements in manufacturing practices in various fields of fabrication and assembly, particularly in the aircraft and automotive industries.

Briefly summarized, the more important of these improvements include:

(1) Increased standardization in the labor and motion of workmen engaged in assembly work, due in part to the simplification of the operations required of them and the speed and certainty with which parts can be connected together without any manual modification being required in such parts to make them fit.

(2) More parts being made interchangeable within the strength and safety factors allowable in contemplation of standard shop practice tolerances.

(3) Lower costs in tooling and assembly, resulting from items (1) and (2) immediately above, and from the need for fewer tools and from increased adjustability in the standardized parts.

(4) Reinforcing and increasing the strength of the joint, so much so that the full shear strength of the bolt may be realized, even when fastening sheet metal and other thin sections together.

(5) Prevention of slippage between members joined or held in fixed relation by the use of my invention.

(6) The method employing oversize holes fitted with rotatably adjustable eccentric adapters takes the play out of the joint by permitting close tolerance accommodation in the contacting members making up the joint, allowing a minimum of slippage between parts when subjected to load or stress.

I claim:

1. The method of attaching contacting members in fixed relation comprising, the provision of openings in each of a pair of such members, such openings being so located that an opening in one such member is approximately opposite an opening in the other such member, the placing in each such opening of a single adapter having an enlarged head and a reinforcing body so extending into the opening as to substantially fill the same, an eccentrically located passage extending longitudinally through said body, so placing such juxtaposed members in position for attachment that opposed openings therein are as nearly in registry as their locations will permit, rotating each opposed adapter within its respective opening until their respective passages are in registry, and securing an elongated fastening shaft through the pair of passages thus aligned with the fastening shaft in contacting engagement with the inner sides of the passages.

2. The method of attaching in fixed relation a pair of contacting members comprising, the provision in such members of opposed companion holes, the introduction of a single rotatable reinforcing body part of an adapter into each such hole so as to substantially fill the same, the provision of a head part on each adapter, such head part being of greater diameter than such body part, the provision of an eccentrically located longitudinal passage through each such body part, the rotation of one of said adapters until the passage therein is aligned with the passage in the other adapter, and the securing through such aligned passages of an elongated fastening member with the fastening member in contacting engagement with the inner sides of the passages.

3. The method of attaching in fixed relation a pair of contacting members comprising, the provision in such members of substantially opposed companion holes, the instroduction of a single rotatable reinforcing adapter into each such hole sufficiently to substantially fill the same, the provision of an eccentrically located longitudinal passage through each such adapter, the rotation of one of said adapters until the passage therein is aligned with the passage in the other adapter, the securing through such aligned passages of an elongated fastening member with the fastening member in contacting engagement with the inner sides of the aligned passages, and the provision of means effecting longitudinal restraint against movement between the adapters and the said juxtaposed members.

4. A fastening apparatus for securing together in fixed relationship a pair of contacting members having contacting surfaces, each contacting member having a hole therein, which holes are in substantially opposed relationship; a pair of adapters, each being unitary and having an enlarged head and a reinforcing body of reduced diameter, one of said reinforcing bodies being rotatably fitted in each of said holes with the head positioned against the outer faces of the contacting members; a passage extending longitudinally through the head and body of each such unitary adapter and located eccentrically with respect to the longitudinal axis thereof, said passages being arranged to be aligned by rotation of the adapters in the holes; an elongated fastening shaft arranged to be inserted through the aligned passages in contacting engagement with the inner sides thereof; and means to secure said shaft and said contacting members in fixed relationship with reference to said adapters.

5. A joint comprising, a pair of contacting members fastened together and having contacting surfaces, each contacting member having a hole therethrough, which holes are in substantial alignment; a pair of adapters, each being unitary and having a reinforcing body portion thereon arranged to fit in one of such holes; an enlarged head on each such adapter arranged to engage the outer surfaces of the contacting members; an eccentrically located passage extending through the head and body portion of each adapter and arranged to be brought into alignment when the opposed adapters are rotated with respect to each other; an elongated fastening member arranged to be inserted through the aligned passages in contacting engagement with the inner sides thereof; and means to secure the shaft and said contacting members in fixed relationship with respect to the adapters.

6. In a joint for fastening contacting members having faying surfaces in fixed relationship; a pair of contacting members having contacting surfaces, such contacting members having opposed holes therein which are overlapping but out of alignment; a pair of unitary adapter members each having a part insertable into one of such holes from the outer sides of the contacting members; a head portion on each such unitary adapter arranged to engage the contacting members to limit movement of the adapters into the holes; an eccentric passage through each said adapter, said passages being substantially of the same interior diameter and arranged to be brought into alignment by rotation of the adapter members; a fastening member arranged to fit in the aligned holes and to be inserted therethrough; and means to attach said shaft and said contacting members in fixed relationship with reference to the adapters.

References Cited in the file of this patent

UNITED STATES PATENTS

| | | |
|---|---|---|
| 833,007 | Slick | Oct. 9, 1906 |
| 1,097,185 | Oehrle | May 19, 1914 |
| 1,213,599 | Dow | Jan. 23, 1917 |
| 1,426,098 | Pruitt | Aug. 15, 1922 |
| 2,690,073 | McLaughlin | Sept. 28, 1954 |

FOREIGN PATENTS

| | | |
|---|---|---|
| 353,887 | Italy | Nov. 3, 1937 |

UNITED STATES PATENT OFFICE
CERTIFICATION OF CORRECTION

Patent No. 3,006,443            October 31, 1961

Joseph T. Siler

It is hereby certified that error appears in the above numbered patent requiring correction and that the said Letters Patent should read as corrected below.

Column 8, line 28, for "instroduction" read -- introduction --; column 8, line 72, and column 9, line 13, for "shaft", each occurrence, read -- member --.

Signed and sealed this 24th day of April 1962.

(SEAL)
Attest:

ESTON G. JOHNSON
Attesting Officer

DAVID L. LADD
Commissioner of Patents